United States Patent Office 3,589,860
Patented June 29, 1971

3,589,860
CINNAMIC ALDEHYDE INHIBITORS
Zisis Andrew Foroulis, Morristown, N.J., assignor to Esso Research and Engineering Company
No Drawing. Filed Oct. 9, 1967, Ser. No. 674,002
Int. Cl. C23f 11/04
U.S. Cl. 21—2.7
9 Claims

ABSTRACT OF THE DISCLOSURE

This disclosure relates to the inhibition of corrosion in chemical and petroleum process equipment exposed to acidic environments. In particular, the present disclosure relates to a method of inhibiting acid-induced corrosion in metal vessels exposed to acid environments by adding to the process streams a very small amount of cinnamic aldehyde or derivatives thereof. It is believed that the cinnamic aldehyde forms a thin film over the metal surface and interferes with the diffusiin of acid to the metal.

BACKGROUND OF THE INVENTION

It is well known that various organic materials cause extensive damages to many metallic surfaces with which they come in contact. Examples of especially destructive inorganic compounds include hydrochloric acid, sulfuric acid, and hydrogen sulfide. With respect to organic compounds, acetic acid, phenolic solutions and naphthenic acids are extremely troublesome. The various organic chlorides also tend to be quite corrosive; they usually do not occur naturally in crude oil but are sometimes added by producers for removal of paraffin deposits in producing wells and pipelines. Generally, these corrosive materials fall within the definition of a Brönsted acid. By definition the Brönsted acid is any substance that will donate one or more protons.

In particular, the petroleum industry has suffered greatly in loss of equipment and time because of the presence of various corrosion-causing compounds. Most crude petroleums contain numerous naturally occurring constituents and impurities which will cause severe corrosion of the metals from which conventional petroleum refining equipment is constructed. Such materials of construction are selected predominantly from carbon steels. While it would be possible to fabricate refinery equipment from steels which are less prone to corrosive attack, the cost of such equipment would be inordinately high and would make any process being conducted within such equipment extremely uneconomical.

In the past, it has been known to use various inhibitors in order to prevent, or at least retard, the oxygen induced corrosion. For instance, benzaldehyde in the presence of oxygen is oxidized to benzoic acid. Consequently, to rid a system of oxygen, which is a particularly corrosive material, one would add benzaldehyde thereby removing the oxygen by utilizing it to oxidize the benzaldehyde to benzoic acid. The benzoic acid, which is highly insoluble, would be precipitated out of solution.

A similar technique could be utilized to remove Brönsted acids from petroleum process streams. For example, molar quantities of Brönsted bases could be added to neutralize the acid components. However, such a solution would not be a very practical one since there is a tremendous daily throughput of feed streams through petroleum or chemical processes which contain acidic materials thereby requiring a correspondingly large amount of neutralizing bases. A further problem arises from the fact that the most likely bases for use in such neutralization reaction would be either organic nitrogen compounds or ammonia. Nitrogen, however, is a severe poison for many petroleum conversion catalysts such as reforming catalysts. Its use would therefore be contraindicated in any feed stream which would eventually contact such conversion catalysts. It is thus evident that a meaningful answer to the problems facing the petroleum industry would not be based on neutralization or removal of the acidic corrosive agents in the feed stream since such techniques would either be prohibitively expensive or would result in deactivation of conversion catalysts.

It has now been unexpectedly discovered that the addition of cinnamic aldehyde or derivatives thereof to process streams serves to prevent the corrosive effects of acidic agents in such streams on metallic surfaces. The effects of even highly corrosive agents such as hydrogen sulfide, hydrogen chloride, other chlorides both organic and inorganic, and sulfuric acid will be successfully inhibited. Generally, the acids which may be inhibited by the instant invention include the organic acids such as acetic acid, napthenic acid, fumaric acid, citric acid, and succinic acid. Solutions containing organic acid halides, formamide, dimethyl-sulfoxide and similar corrosive materials (either per se or by decomposition or hydrolysis) may be successfully treated. The corrosive effect of various corrosive inorganic acids on metal surfaces may be inhibited by the use of the present inventive process. Examples of inorganic acids contained in process streams upon which the practice of the present invention is useful include hydrochloric acid, sulfuric acid, dilute nitric acid, sulfurous acid, dilute perchloric acid, polyphosphoric acid, etc.

The metals which may be protected from corrosion by the process of the instant invention include carbon steel, nickel steel, copper and its alloys, stainless steels, etc. However, it should be emphasized that this invention will be most useful in preventing the corrosion of carbon steel, particularly as used in petroleum refinery facilities.

The present invention will be practiced with most effectiveness in an inert atmosphere, i.e., in the atmosphere in which oxygen is present only in trace amounts if at all. It will be utilized most particularly in areas where chemical reactions or physical change occur in an inert atmosphere, such as nitrogen, hydrogen, carbon monoxide, carbon dioxide, nitrogen, or mixtures of these various inert gases. The atmosphere may also contain small amounts of sulfur dioxide or sulfur trioxide. Such an inert atmosphere is found frequently during the regeneration of catalysts for hydroforming, hydrotreating or other catalytic hydrogenation processes. It is an important aspect of this invention that in all instances no significant adverse effect upon catalyst activity results from contact of the catalyst with the cinnamic aldehyde or its derivatives. This is particularly important in the case of hydroforming or hydrotreating where the catalysts are expensive and it is extremely crucial, from a process economy point of view, to extend their life for as long as possible. While the present invention is useful in preventing acid-induced corrosion generally, it is particularly useful where inert or reducing atmospheres are present. For demonstration purposes only, the following discussion will utilize hydroforming as a particular example wherein the process of the present invention may be utilized with particular advantage.

Hydroforming is now a matter of record and commercial practice in this country. Basically, the operation involves the contacting of a naphtha, either virgin, cracked, Fischer-Tropsch or any mixture thereof, with a solid catalytic material. The catalyst usually includes platinum or palladium dispersed upon alumina. Catalytic material is contacted with the feedstock at elevated temperatures and pressures in the presence of added hydrogen.

The reactions involved in hydroforming are: (1) dehydrogenation of naphthenes to the corresponding aromatic hydrocarbons as where methylcyclohexane is dehydrogenated to form toluene; (2) isomerization of paraffins to form branched-chain paraffins or isomerization of ring compounds, such as ethylcyclopentane to form methylcyclohexane, which latter compound is then dehydrogenated to form toluene; (3) dehydrocycloization of paraffins to aromatics such as n-heptane to form toluene; and (4) hydrocracking of the higher boiling constituents of the feed to form lower boiling constituents.

As indicated above, catalysts that may be used for hydroforming a feedstock are those containing 0.01 to 1.0 wt. percent platinum or 0.1 to 2.0 wt. percent palladium dispersed upon a highly pure alumina support such as is obtained from aluminum alcoholate, as per U.S. Pat. No. 2,636,865, or from an alumina hydrosol prepared by hydrolyzing aluminum metal with dilute acidic acid in the presence of very small catalytic amounts of mercury. A suitable catalyst comprises about 0.2 to 0.8 wt. percent platinum widely dispersed upon alumina in the eta or gamma phase derived from a suitable aluminum alcoholate and between about 0.3 and 1.2 wt. percent chloride and having a surface area of about 50 to 300 square meters per gram. However, a variety of other catalysts may be utilized such as platinum on desurfaced silica-alumina.

Regeneration occurs at least once a month for each hydroforming reactor depending upon the feed quality and feed severity. However, in many cases more frequent regeneration is required. During regeneration coke is burned from the catalyst producing an environment which has a fair concentration of $CO_2$ and small quantities of $SO_2$ and $SO_3$. During this step, the chlorides to be found in the gas phase will increase due to an increase in water content of the gas which serves to strip the chlorine off the catalyst. The second step is to remove any water left on the catalyst. This means thorough drying of the flue gas, which is a mixture of nitrogen, $CO_2$, CO, $SO_2$, $SO_3$ and HCl. After most of the water has been removed, chlorination is started in a manner such that chlorine will be progressively absorbed by the catalyst. During the subsequent rejuvenation of the catalyst to rearrange the crystal structure, some chlorine will still be carried over with the flue gas. The last step in the regeneration operation is purging the system with nitrogen, an inert gas, to remove air and finally pressure up with hydrogen. It is after purging that the inhibitor of the instant invention is injected in the system to prevent its possible oxidation by air at the high temperatures. The presence of the inhibitor serves to reduce or minimize corrosion in heat exchanging equipment and transfer lines where water condensate, containing the acidic components mentioned previously, accumulates. The inhibitor compound adsorbs on the metal surface and minimizes corrosion by markedly lowering the rate of the corrosion reactions. As indicated earlier, the presence of cinnamic aldehyde and derivatives thereof, preferably in the absence of oxygen, serves to inhibit the corrosive effects of various acid-based corrosion-causing materials on metals. Here, as in the case of hydroforming, an inert gas, e.g., nitrogen, is present and, in addition, corrosives such as hydrogen sulfide, hydrochloric acid and sulfuric acid are present. The addition of a cinnamic aldehyde-based inhibitor serves to minimize corrosion with no adverse effect on the platinum or palladium catalyst.

Another area where corrosion in an inert gas atmosphere is very widespread and has a most deleterious effect is in hydrotreating. Briefly, hydrotreating involves three main sets of reactions. Initially, there is sulfur reduction; sulfur in the form of mercaptan, disulfide of thiophene is reduced. In addition, oxygen is removed from various compounds such as phenol and peroxide. Olefins are saturated and form the corresponding paraffinic compounds. All of these reactions require the presence and consumption of hydrogen. These reactions may take place in the presence of a variety of catalysts; perhaps the most widely used is cobalt molybdate.

A great problem in hydrotreating is the presence of organic chlorides such as carbon tetrachloride and trichloroethylene. In addition, hydrogen chloride is often found in the hydrotreaters; the original source of this hydrogen chloride may be organic chloride or it may arise from hydroformer treat gas such as, for example, by the decomposition of the chlorine-treated catalyst base. In any event, the hydrotreater effluent condenser and other overhead equipment has been plagued with problems instigated by the presence of hydrogen chloride.

In addition, as would be expected, a great deal of hydrogen sulfide is produced when sulfur is reduced in the hydrotreater. This causes severe corrosion particularly in the presence of water condensate. The effluent stream in the hydrotreater is in addition to naphtha predominantly hydrogen gas which is inert for the purposes of the present invention. The remainder of the gas is made up of water vapors, hydrogen chloride and hydrogen sulfide. The addition of cinnamic aldehyde or its derivatives to this effluent stream serves to inhibit metal corrosion.

Once again it should be emphasized that substantially no oxygen is present in the stream and that, in general, oxygen is not to be desired since it will be detrimental to the effective inhibition of corrosion by the additives of the present invention. Additionally, the addition of cinnamic aldehyde-based additives results in no detrimental effect on the catalyst used in hydrotreating. All hydrotreating reactions may be improved by the instant process; this would include the Unifining operations sponsored jointly by Union Oil Company and UOP, the Trickle process of the Shell Oil Company and the Hydrofining process of Esso Research and Engineering Company.

The preferred corrosion inhibitor of the present invention is cinnamic aldehyde. This substance has a formula which corresponds to the following:

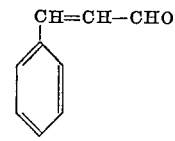

It is also possible to utilize derivatives of cinnamic aldehyde as corrosion inhibitors. Such derivatives have a general formula which corresponds to the following:

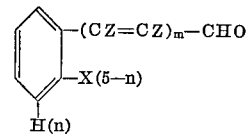

where X may be a lower alkyl (—R), —OR, —OH, —OCOR, —COR or —(CZ=CZ)$_m$—CHO, Z may be hydrogen or a lower alkyl (—R), $n$ is an integer from 0 to 5 and $m$ is an integer from 1 to 10.

The concentration of inhibitor may vary widely depending upon the particular corrosion solution and the pH of the solution. For a corrosion solution of pH of 0 to 1, it is desirable that from $10^{-6}$ to $5 \times 10^{-1}$ moles of inhibitor per liter of corrosion solution, preferably $10^{-4}$ to $10^{-1}$ moles/liter of inhibitor, should be added. When the corrosion solution has a pH of 1 to 4, about $10^{-5}$ to $2\times10^{-1}$ moles of corrosion inhibitor should be added per liter of corrosion solution, most preferably $10^{-4}$ to $10^{-1}$ moles/liter. The cinnamic aldehyde or derivatives thereof may be added directly into the vapor or liquid stream. In the case of the hydroforming or hydrotreating processes, the inhibitor should be injected directly into the vapor stream at the outlet of the hydroforming or hydrotreating reactor.

While the mechanism for the inhibiting action of cinnamic aldehyde or its derivatives is not completely understood, the following explanation is offered for the purpose of example and as an aid to understanding the invention and should not be taken as limiting the scope of the invention in any manner. The corrosion additive, e.g., cinnamic aldehyde or its derivatives, is believed to be adsorbed on the metal surface in the form of either a continuous or nearly continuous thin film. This film would serve to inhibit any chemical or electrochemical interaction between the acidic corrosive material in solution and the metal surface. It should be noted that very small quantities of the inhibitor are utilized to form this thin film and that the inhibitor is not believed to undergo any significant chemical reaction with the acidic corrosive material. Thus if at all only small amounts of additional inhibitor would be necessary to maintain long-term protection on metal surfaces, these additions being possibly necessitated by attrition losses due to physical interactions of the flowing stream with the film.

The additive of the instant invention exhibits utility under extremely broad temperature ranges. Cinnamic aldehyde and its derivatives collectively inhibit corrosion due to acidic agents at temperatures in the range from about 0 to 550° F., preferably from 50 to 350° F. Under most preferred conditions the additive would be utilized at a temperature range of from 80 to 212° F. The pressure range in which the present invention may be practiced is also quite broad and pressures in the range of from about 15 to 400 p.s.i.g. may be utilized. It is understood that pressure is not critical since the invention may be utilized with the additive in both the liquid and the vapor phase.

As indicated previously, it is important that the additive of this invention be utilized in an atmosphere which is inert to the additive, that is to say, an atmosphere in which oxygen, if present at all, is not found in greater amounts than 0.5 to 1% by weight. Satisfactory environments for the instant invention include nitrogen, hydrogen, carbon dioxide, carbon monoxide, mixtures thereof, and flue gas in general. The presence of excessive oxygen serves to oxidize the aldehyde grouping of the cinnamic aldehyde or its derivatives to the corresponding acid and/or polymerization products. These acids are believed to be far less effective for the purposes of the present invention than the corresponding aldehydes.

The additive may be utilized in the following concentrations (in moles) per liter of corrosive fluid:

|  | Moles/liter |
|---|---|
| Broad range | $10^{-6}$–$5\times10^{-1}$ |
| Preferred range | $10^{-5}$–$2\times10^{-1}$ |
| Most preferred range | $10^{-4}$–$10^{-1}$ |

The present invention will be more fully understood by referring to the following examples.

Example 1

This example illustrates the efficacy of cinnamic aldehyde as an inhibitor of acid-induced corrosion in carbon steel exposed to 0.1 normal hydrochloric acid. Corrosion rates were measured by weight loss of carbon steel (1020) specimens of approximately 10 sq. cent. area. The specimens were abraded through 4–0 emery paper degreased in benzene, and washed in distilled water. Immediately after drying the specimens were weighed and placed in an appropriate corrosion cell and immersed in the corrosive solution. The amount of corroded metal was determined by weight loss. The test time was 2 days. The corrosion cell was basically a 2000 ml. Erlenmeyer flask with a special top to permit entrance and exit of nitrogen for deaeration and to prevent air contamination. A removable chimney was introduced in the corrosion cell from which the metal samples are suspended, using suitable Pyrex hooks. The corrosive solution was deaerated with nitrogen before a run. Nitrogen was also bubbled through the solution continuously during a run to prevent contamination with air. Constant temperature was achieved by the use of constant temperature oil bath or by using individual heating units with temperature controls.

The results of representative experiments utilizing the above procedure are summarized below in Table I.

TABLE I

Protective properties of cinnamic aldehyde to control corrosion of 1020 carbon steel in 0.1 N HCl (pH=1.0), 25° C.

| Inhibitor concentration, moles of inhibitor/liter of solution | Corrosion rate (m.d.d.) mg./dec.²/day | Percent inhibitor efficiency* |
|---|---|---|
| Blank | 1,555 | |
| $10^{-4}$ moles/l. cinnamic aldehyde | 707 | 54.5 |
| $5\times10^{-3}$ moles/l. cinnamic aldehyde | 123 | 92.1 |
| $10^{-2}$ moles/l. cinnamic aldehyde | 10.2 | 99.3 |
| $10^{-1}$ moles/l. cinnamic aldehyde | 10.2 | 99.3 |

*The efficiency of an inhibitor to reduce corrosion is expressed as percent inhibitor efficiency $$(=\frac{I_0-I_i}{I_0}\times100)$$

where $I_0$ is the corrosion rate without and $I_i$ is the corrosion rate with inhibitor.

Example 2

This example demonstrates the corrosion inhibition properties of cinnamic aldehyde in low concentrations in solutions obtained from Powerformer regeneration circuit condensate. The pH of this solution was 0.5 and the temperature of the test was 100° C. This represents an extremely corrosive environment for carbon steel. With the exceptions of solution identity and temperature the procedure utilized was that of Example 1. The time of testing in this instance was about 7 days. The results are summarized in Table II.

TABLE II

Protective properties of cinnamic aldehyde to control corrosion of 1020 carbon steel in Powerformer regeneration circuit condensate solution (pH=0.5), at 100° C. (212° F.)

| Inhibitor concentration, moles of inhibitor/liter of solution | Corrosion rate (m.d.d.) mg./dec.²/day | Percent inhibitor efficiency* |
|---|---|---|
| Blank | 41,114 | |
| $10^{-1}$ moles/l. cinnamic aldehyde | 620 | 98.5 |
| Do | 637 | 98.45 |
| Do | 602 | 98.54 |

What is claimed is:

1. A method of inhibiting corrosion of a metal vessel by an aqueous acidic condensate in an inert vapor process stream contained in said metal vessel, which comprises adding a corrosion inhibiting amount of cinnamic aldehyde to said process stream.

2. A method according to claim 1 in which said metal is carbon steel.

3. A method according to claim 1 in which said vessel is a petroleum process vessel.

4. A method according to claim 1 in which said inert process stream contains no more than about 1% by weight of oxygen.

5. A method according to claim 1 in which said process stream contains a vapor phase hydrocarbon.

6. A method according to claim 1 in which said condensate is hydrochloric acid.

7. A method according to claim 1 in which said aqueous acidic condensate has a pH not over about 4.

8. A method according to claim 1 in which the concentration of corrosion inhibitor in said aqueous acidic condensate is from $10^{-6}$ to $5\times10^{-1}$ moles per liter.

9. A method according to claim 1 in which the concentration of corrosion inhibitor in said aqueous acidic condensate is from $10^{-5}$ to $2 \times 10^{-1}$ moles per liter.

References Cited

UNITED STATES PATENTS

| | | | |
|---|---|---|---|
| 3,005,778 | 10/1961 | Sweetman | 252—396X |
| 3,325,410 | 6/1967 | Crotty | 252—387X |
| 3,453,203 | 7/1969 | Foroulis | 252—146X |

OTHER REFERENCES

Jenny, Chem. Abstracts, 50:8431 (1956).

RICHARD D. LOVERING, Primary Examiner

I. GLUCK, Assistant Examiner

U.S. Cl. X.R.

252—146, 396, 407